(12) United States Patent
Tanaka

(10) Patent No.: US 10,868,962 B2
(45) Date of Patent: Dec. 15, 2020

(54) IMAGE CAPTURING APPARATUS PERFORMING IMAGE STABILIZATION, CONTROL METHOD THEREOF, AND STORAGE MEDIUM

(71) Applicant: CANON KABUSHIKI KAISHA, Tokyo (JP)

(72) Inventor: Hiroyo Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 16/277,903

(22) Filed: Feb. 15, 2019

(65) Prior Publication Data

US 2019/0260938 A1 Aug. 22, 2019

(30) Foreign Application Priority Data

Feb. 19, 2018 (JP) ................ 2018-027246

(51) Int. Cl.
 *G03B 5/00* (2006.01)
 *H04N 5/232* (2006.01)

(52) U.S. Cl.
 CPC ........ *H04N 5/23287* (2013.01); *G03B 5/00* (2013.01); *H04N 5/2327* (2013.01); *H04N 5/23267* (2013.01); *G03B 2205/0007* (2013.01)

(58) Field of Classification Search
 CPC ............ G03B 5/00; G03B 2205/0007; H04N 5/23287
 See application file for complete search history.

(56) References Cited

U.S. PATENT DOCUMENTS

| 2015/0124153 A1 | 5/2015 | Hamada |
| 2016/0127649 A1 | 5/2016 | Tsuchiya |
| 2020/0096783 A1* | 3/2020 | Togawa ............... G03B 17/14 |

FOREIGN PATENT DOCUMENTS

| CN | 103379275 A | 10/2013 |
| CN | 106067944 A | 11/2016 |
| CN | 107135349 A | 9/2017 |
| EP | 2023610 A1 | 2/2009 |
| JP | 5736512 B2 | 6/2015 |
| JP | 2016-167801 A | 9/2016 |

* cited by examiner

*Primary Examiner* — Minh Q Phan
(74) *Attorney, Agent, or Firm* — Canon U.S.A., Inc. IP Division

(57) ABSTRACT

An image capturing apparatus comprises: a shake detection sensor which detects shaking; a calculation circuit which calculates a first shake correction amount based on a shake signal output from the shake detection sensor; a transmitting circuit which transmits the first shake correction amount to a lens apparatus that comprises first image stabilization apparatus for correcting shaking by moving an optical system; and a lens characteristics correction circuit which performs correction regarding lens characteristics in an image signal obtained by image-capturing in a state in which the first image stabilization apparatus has corrected shaking, based on the first shake correction amount, wherein the lens characteristics correction circuit performs the correction regarding lens characteristics based on the first shake correction amount at a time prior to the image-capturing time by a predetermined time.

16 Claims, 9 Drawing Sheets

IMAGE CAPTURING APPARATUS PERFORMING IMAGE STABILIZATION, CONTROL METHOD THEREOF, AND STORAGE MEDIUM

BACKGROUND OF THE INVENTION

Field of the Invention

The present invention relates to an image capturing apparatus that performs image stabilization, a control method thereof, and a storage medium.

Description of the Related Art

It is known that, in general, because a light amount decreases and aberration occurs in the periphery of an image sensor due to optical lens characteristics, the image quality of a subject image that is projected on the image sensor through an optical system decreases. Also, in the case where camera shake correction control is performed in an image capturing apparatus including an optical lens, because a camera shake driving apparatus such as a camera shake correction lens or an image sensor moves according to the amount of vibration of the image capturing apparatus, the image quality further decreases in the periphery of the image sensor. With regard to such a problem, a method has been proposed in which correction regarding the lens characteristics is performed according to the relative positions of the center of the image sensor and the optical axis center of the optical system (Japanese Patent No. 5736512).

Also, an image capturing apparatus that includes a plurality of camera shake correction driving apparatuses in order to deal with a larger camera shake by enlarging the driving range of a driving apparatus has appeared, and a technique has also been proposed in which marginal illumination is corrected in such an image capturing apparatus that includes a plurality of camera shake correction driving apparatuses (Japanese Patent Laid-Open No. 2016-167801).

In an image capturing apparatus described in Japanese Patent No. 5736512, optical distortion correction or shading correction is performed, by a camera shake correction apparatus, on a subject image captured by an image sensor according to the relative positions of the center of the image sensor and the optical axis center of a shooting optical system that have been moved. Degradation of image quality in the periphery of the image sensor due to relative positional movements of the camera shake correction lens, the image sensor, and the like can be reduced by using this technique.

On the other hand, the image capturing apparatus described in Japanese Patent Laid-Open No. 2016-167801 includes a lens driving apparatus that performs camera shake correction by moving the camera shake correction lens and an image sensor driving apparatus that performs camera shake correction by moving the image sensor. In this image capturing apparatus, when the camera shake correction is switched between correction performed by the lens driving apparatus and correction performed by the image sensor, the correction amount of marginal illumination of an image captured by the image sensor changes. With this configuration, the marginal illumination can be appropriately corrected according to the driving apparatus that is selected to perform camera shake correction.

Incidentally, when camera shake correction and correction regarding lens characteristics are performed in an image capturing apparatus that uses an interchangeable lens that includes a camera shake correction lens, the timing at which camera shake correction is performed is shifted from the timing at which correction regarding the lens characteristics is performed due to the time delay in communication between the interchangeable lens and the image capturing apparatus. When the timing shift between the camera shake correction and the correction regarding the lens characteristics is prominent, there is a possibility that image quality degrades, because image correction processing is performed in a state in which the image is excessively corrected or insufficiently corrected. In this regard, the delay time in communication between the interchangeable lens and the image capturing apparatus is not taken into consideration in Japanese Patent No. 5736512. Also, in Japanese Patent Laid-Open No. 2016-167801, although camera shake correction in which the lens driving apparatus and the image sensor driving apparatus are driven at the same time is not considered, because lens characteristics correction unit is provided on the image capturing apparatus side, measurement information needs to be transmitted from the interchangeable lens to the image capturing apparatus, and a control value needs to be transmitted from the image capturing apparatus to the interchangeable lens. That is, when correction regarding the lens characteristics is performed, communication between the interchangeable lens and the image capturing apparatus needs to be performed, and the correction is influenced by communication delay, but the communication delay is not taken into consideration.

In this way, in an image capturing apparatus that uses an interchangeable lens that includes a camera shake correction lens, it is difficult to perform correction regarding lens characteristics in real time according to the state of a camera shake correction apparatus while performing camera shake correction. That is, there are cases where an image is excessively or insufficiently corrected due to the communication delay when a correction amount is transmitted, depending on the timing, and an appropriate correction result cannot be obtained.

SUMMARY OF THE INVENTION

The present invention has been made in consideration of the aforementioned problems, and realizes a technique in which, when correction regarding lens characteristics is performed in a camera main body while using a camera shake correction apparatus on an interchangeable lens side, at least the influence of delay in communication between the interchangeable lens and the camera main body is reduced.

In order to solve the aforementioned problems, one aspect of the present invention provides an image capturing apparatus, comprising: a shake detection sensor which detects shaking; a calculation circuit which calculates a first shake correction amount based on a shake signal output from the shake detection sensor; a transmitting circuit which transmits the first shake correction amount to a lens apparatus that comprises first image stabilization apparatus for correcting shaking by moving an optical system; and a lens characteristics correction circuit which performs correction regarding lens characteristics in an image signal obtained by image-capturing in a state in which the first image stabilization apparatus has corrected shaking, based on the first shake correction amount, wherein the lens characteristics correction circuit performs the correction regarding lens characteristics based on the first shake correction amount at a time prior to the image-capturing time by a predetermined time.

Another aspect of the present invention provides, a control method of an image capturing apparatus comprising:

detecting shaking using a shake detection sensor; calculating a first shake correction amount based on a shake signal output from the shake detection sensor; transmitting the first shake correction amount to a lens apparatus that comprises a first image stabilization apparatus that corrects shaking by moving an optical system; and performing correction regarding lens characteristics in an image signal obtained by image-capturing in a state in which the first image stabilization apparatus has corrected shaking based on the first shake correction amount, based on the first shake correction amount at a time prior to the image-capturing time by a predetermined time.

Still another aspect of the present invention provides, a non-transitory computer-readable storage medium storing a program for causing a computer to execute a control method of an image capturing apparatus, the method comprising: detecting shaking using a shake detection sensor; calculating a first shake correction amount based on a shake signal output from the shake detection sensor; transmitting the first shake correction amount to a lens apparatus that comprises a first image stabilization apparatus that corrects shaking by moving an optical system; and performing correction regarding lens characteristics in an image signal obtained by image-capturing in a state in which the first image stabilization apparatus has corrected shaking based on the first shake correction amount, based on the first shake correction amount at a time prior to the image-capturing time by a predetermined time.

According to the present invention, when correction regarding lens characteristics is performed in a camera main body while using a camera shake correction apparatus on an interchangeable lens side, at least the influence of delay in communication between the interchangeable lens and the camera main body can be reduced.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

First Embodiment

Hereinafter, exemplary embodiments of the present invention will be described in detail with reference to the drawings. Note that the following describes an example in which a digital camera to which an interchangeable lens can be attached and in which image stabilization is possible is used as an image capturing apparatus. However, the present embodiment is not limited to digital cameras, but can also be applied to other devices to which an interchangeable lens can be attached and in which image stabilization is possible. These devices may include mobile phones including a smartphone, a game machine, a medical device, a device in an on-vehicle system, a robot device that makes determination based on a captured image, and a flying device such as a drone, for example.

Configuration of Image Capturing System

Figure 1A:
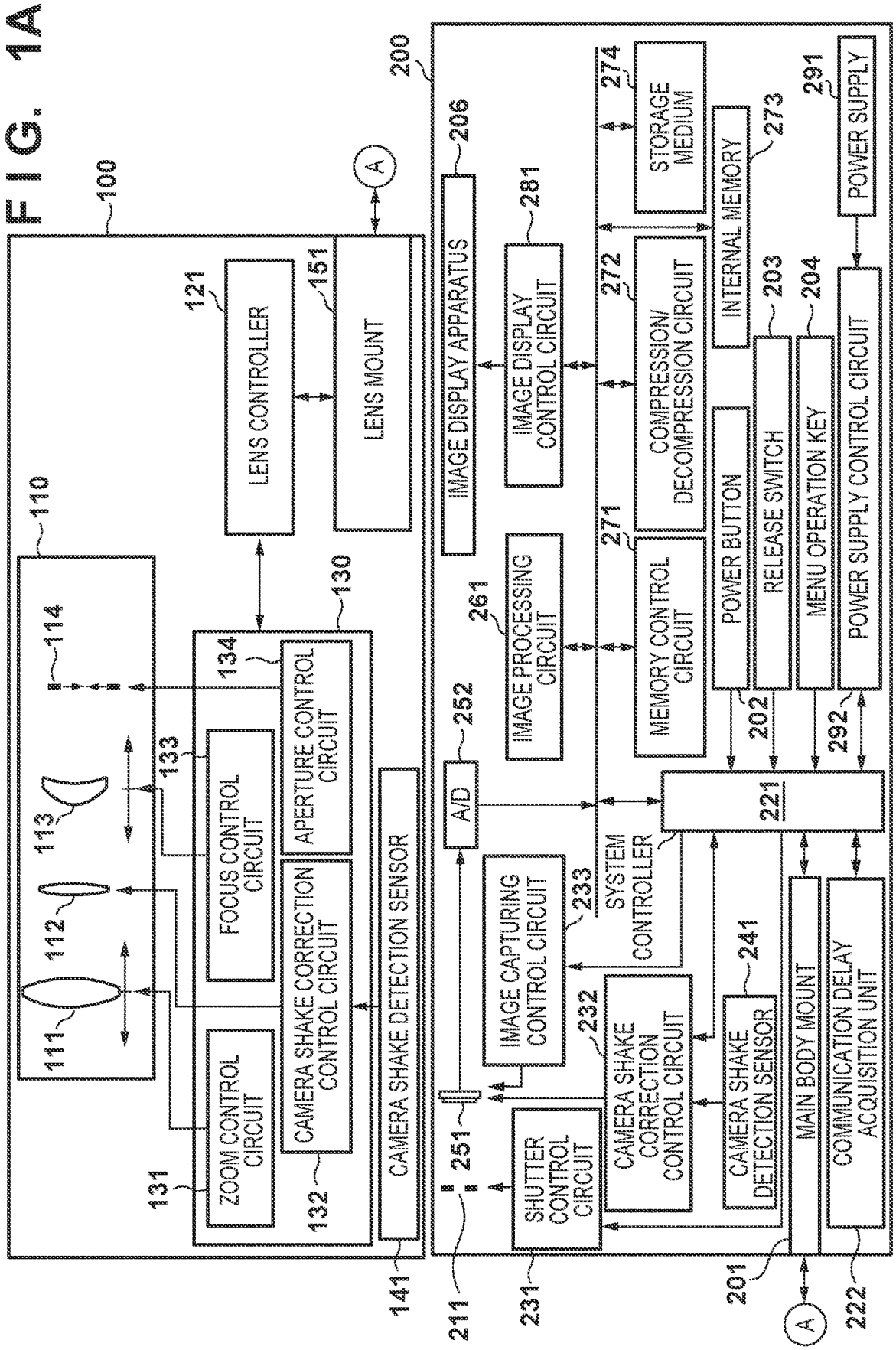
FIGS. 1A and 1B are diagrams illustrating an exemplary configuration of a digital camera as an example of an image capturing apparatus according to a first embodiment.
Figure 1B:
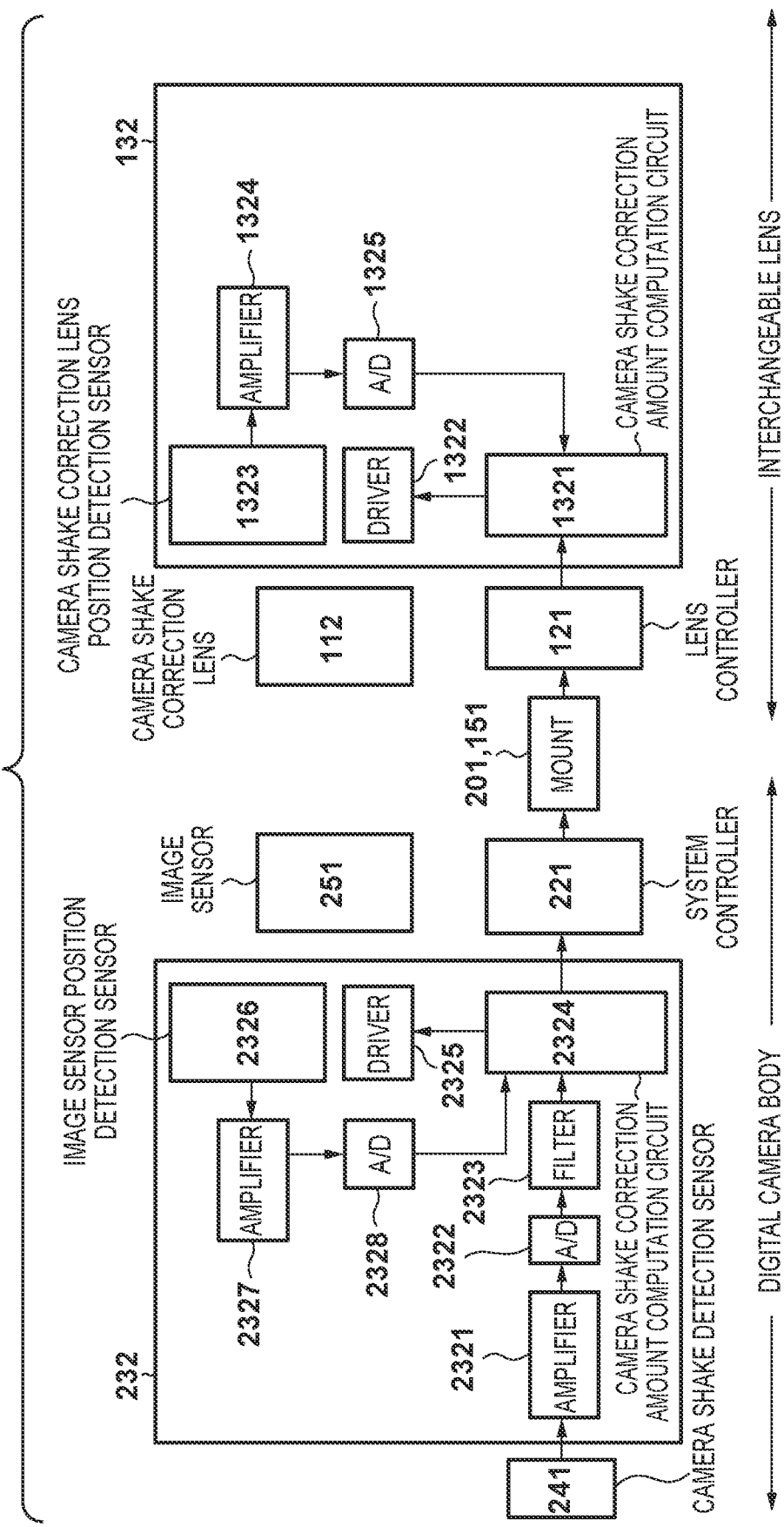

FIG. 1A is a block diagram illustrating an exemplary functional configuration of an image capturing system including a digital camera 200 and an interchangeable lens 100, which serves as an example of the image capturing apparatus according to the present embodiment. Note that one or more functional blocks shown in FIGS. 1A and 1B may be realized by hardware such as an ASIC or a programmable logic array (PLA), or may be realized by a programmable processor such as a CPU or an MPU executing software. Also, such functional blocks may also be realized by a combination of software and hardware. Accordingly, in the following description, even in the case where processing is described as being performed by different functional blocks, these blocks can be realized by the same hardware.

In the present embodiment, an example will be described in which the digital camera 200 performs correction processing regarding lens characteristics in which a camera shake is corrected by driving a camera shake correction lens in the interchangeable lens 100 and an image sensor in the digital camera 200 at the same time.

The interchangeable lens 100 generally includes an optical block 110, a lens control block 130, a lens mount 151, and a lens controller 121. The optical block 110 includes a zoom lens 111, a camera shake correction lens 112, a focus adjustment lens 113, and an aperture 114. The zoom lens 111 is configured to be reciprocally movable, and reciprocally moves according to control performed by a zoom control circuit 131 so as to enlarge or shrink an optical image formed on an image sensor of the digital camera 200. The camera shake correction lens 112 changes its position according to a control performed by a camera shake correction control circuit 132 so as to correct camera shake. The focus adjustment lens 113 is configured to be reciprocally movable, and reciprocally moves according to a control performed by a focus control circuit 133 so as to change the focal position. The aperture 114 changes its aperture diameter according to a control performed by an aperture control circuit 134 so as to change the amount of light to be incident on the image sensor of the digital camera 200.

The lens control block 130 controls driving the constituent members included in the optical block 110, and includes the zoom control circuit 131, the camera shake correction control circuit 132, the focus control circuit 133, the aperture control circuit 134, and the like. These control circuits each control the driving of a corresponding lens in the optical block 110 according to an instruction from the lens controller 121.

The lens controller 121 includes a CPU (or MPU), a ROM, and a RAM, for example, and controls overall operations of the interchangeable lens 100 and data transfer between the units of the interchangeable lens 100 by deploying a program stored in the ROM to the RAM and executing the deployed program. Also, the lens controller 121 may execute some of or all of the computations to be executed by the later-described camera shake correction control circuit 132 in place of the camera shake correction control circuit 132.

A camera shake detection sensor 141 includes an angular velocity sensor (gyroscope) or the like, for example, and detects vibration applied to the interchangeable lens 100. The camera shake correction control circuit 132 corrects camera shake based on an output of the camera shake detection sensor 141 or a camera shake correction amount received from the digital camera 200. The following describes an example in which the camera shake is corrected based on a camera shake correction amount received from the digital camera 200. However, the camera shake correction control circuit 132 may perform, in normal shooting, camera shake correction based on a camera shake signal from the camera shake detection sensor 141, and may, upon detecting a predetermined scene such as a scene in which camera shake is large, switch to camera shake correction based on a camera shake correction amount received from the digital camera 200.

The lens mount 151 can be mechanically and electrically connected to the digital camera 200, and can receive control commands, other pieces of data, and power from the digital camera 200.

Next, the digital camera 200 will be described. The digital camera 200 is a main body of the image capturing apparatus, and includes the following constituent elements. An image sensor 251 has a configuration in which a plurality of pixels each having a photoelectric conversion element are arrayed two dimensionally, converts an optical image incident thereon via the interchangeable lens 100 to an electrical signal, which is an analog image signal, and outputs the analog image signal. An image capturing control circuit 233 controls a timing at which the image sensor 251 outputs an image signal and the like. The image sensor 251 includes a driving apparatus for changing the position of the image sensor relative to an optical axis. The driving apparatus changes the position of the image sensor relative to the optical axis according to a position control signal generated by a camera shake correction control circuit 232, and as a result, the image sensor 251 can exert an image stabilization function.

The A/D converter 252 converts the analog image signal output from the image sensor 251 to a digital image signal. The digital image signal output from the A/D converter 252 is stored in an internal memory 273 via a bus. A memory control circuit 271 controls writing of data to the internal memory 273 and reading out of data from the internal memory 273 according to an instruction from a system controller 221. In addition, the memory control circuit 271 controls the A/D converter 252, an image processing circuit 261, and a compression/decompression circuit 272 so as to control recording of data to a storage medium 274.

The image processing circuit 261 includes computation circuits such as an ASIC or a GPU for image processing, and performs predetermined processing such as pixel interpolation processing or color conversion processing on an image signal from the A/D converter 252 or the memory control circuit 271. The predetermined processing includes later-described correction processing regarding lens characteristics. Note that some of or all of the processing executed by the image processing circuit 261 may be executed by the system controller 221 in place of the image processing circuit 261.

A shutter control circuit 231 controls operations of a shutter 211 according to a trigger signal from the system controller 221. The shutter 211 causes a shutter to operate according to the control of the shutter control circuit 231.

A camera shake detection sensor 241 includes an angular velocity sensor (gyrosensor) or the like, for example, and detects vibration applied to the digital camera 200. The camera shake correction control circuit 232 corrects camera shake based on an output from the camera shake detection sensor 241.

An image display control circuit 281 controls an image display apparatus 206 constituted by a TFT, an LCD, or the like so as to display a moving image, a still image, a menu screen, and the like. A display image signal written to the internal memory 273 is sent to the image display apparatus 206 via the image display control circuit 281, and the image display apparatus 206 performs display. The internal memory 273 includes a volatile memory such as a semiconductor memory, for example, and is an internal memory for storing captured still images and moving images. Also, the internal memory 273 can also be used as a work area of the system controller 221. The compression/decompression circuit 272 includes a compression/decompression circuit for compressing and decompressing an image signal, reads out an image stored in the internal memory 273, performs compression processing or decompression processing on the read-out image, and again writes resultant data of the processing to the internal memory 273.

A main body mount 201 can be mechanically and electrically connected to the interchangeable lens 100, and supplies control signals from the system controller 221 and power from a power supply 291 to the interchangeable lens 100 via the lens mount 151.

The system controller 221 includes a computation circuit such as a CPU (or MPU), deploys a program recorded in a storage medium 274 to the internal memory 273, executes the deployed program, and controls the units of the digital camera 200 and data transfer between the units. The storage medium 274 is a storage medium such as a memory card for recording shot images, and is constituted by a semiconductor memory, a magnetic disc, or the like. The storage medium 274 stores a program for the system controller and constants for operation.

A power button 202, a release switch 203, and a menu operation key 204 are operation members for inputting various operation instructions to the system controller 221, and are each constituted by a switch, a dial, or a touch panel, or a combination thereof. The power button 202 is an operation member that generates a trigger for powering on or off of the digital camera 200. The release switch 203 is an operation member for generating a trigger signal for causing a shutter to operate in order to record a still image, and a trigger signal for starting or stopping moving image recording. The menu operation key 204 is an operation member for generating a signal for configuring settings of the digital camera 200.

A power supply control circuit 292 supplies, triggered by a signal generated by the power button 202, power from the power supply 291 to the units of the digital camera 200.

Figure 3:
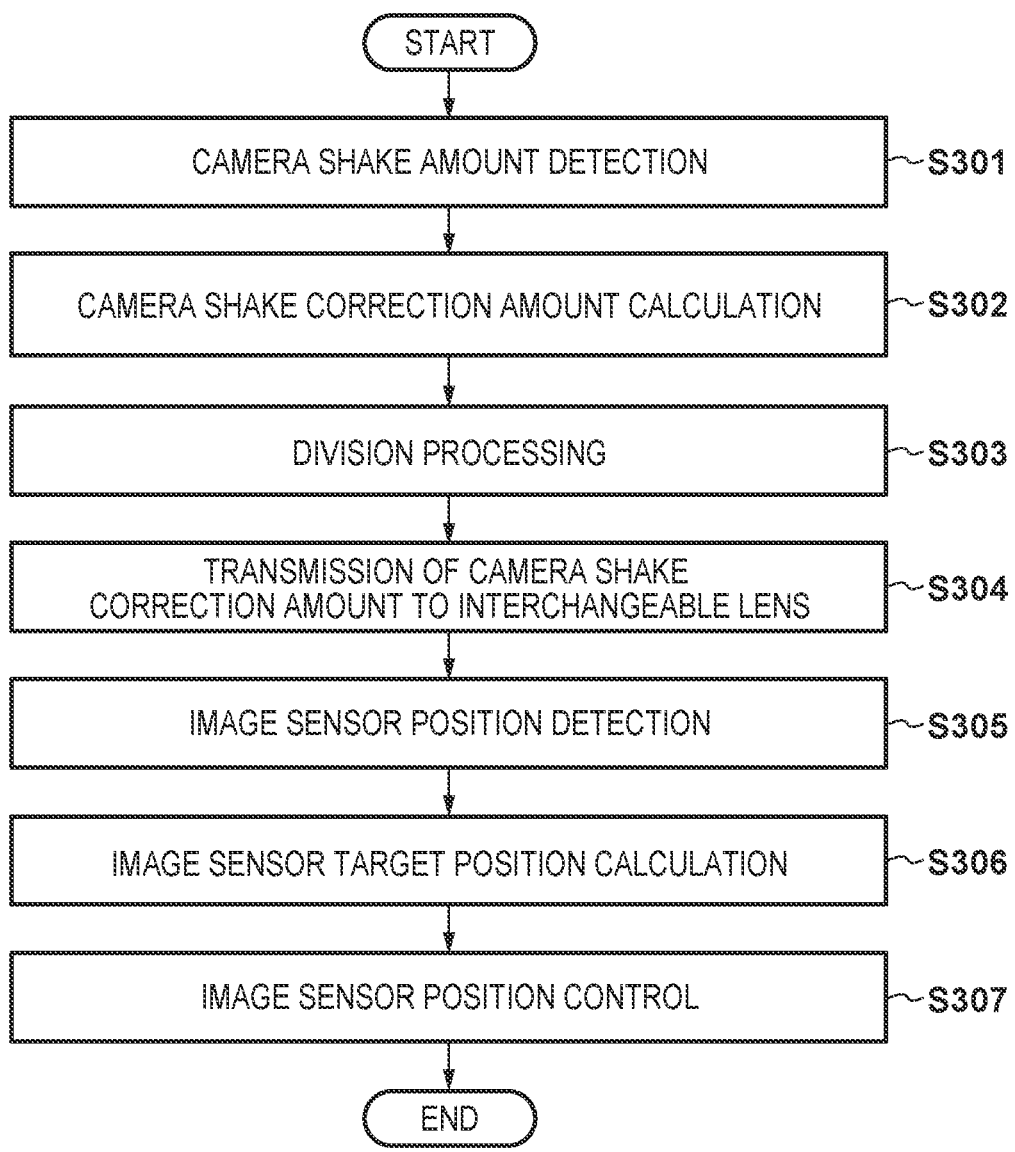
FIG. 3 is a flowchart illustrating series of operations of camera shake correction processing in the digital camera according to the first embodiment.

Configuration Relating to Camera Shake Correction Processing and Series of Operations First, a series of operations relating to camera shake correction processing in which camera shake correction is performed by controlling the position of the image sensor 251 will be described, with reference to FIG. 3. Also, a series of operations relating to the camera shake correction processing will be described with reference to FIG. 1B, which illustrates a detailed exemplary functional configuration of the camera shake correction control circuit 232 of the digital camera 200.

Note that this processing is realized by the system controller 221 of the digital camera 200 deploying a program recorded in the storage medium 274 to the internal memory 273, executing the deployed program, and controlling the units of the digital camera 200. Also, the series of operations shown in FIG. 3 is started when a user holds the digital camera 200 by hand and starts shooting, or prepares to shoot, a given subject.

Figure 2:
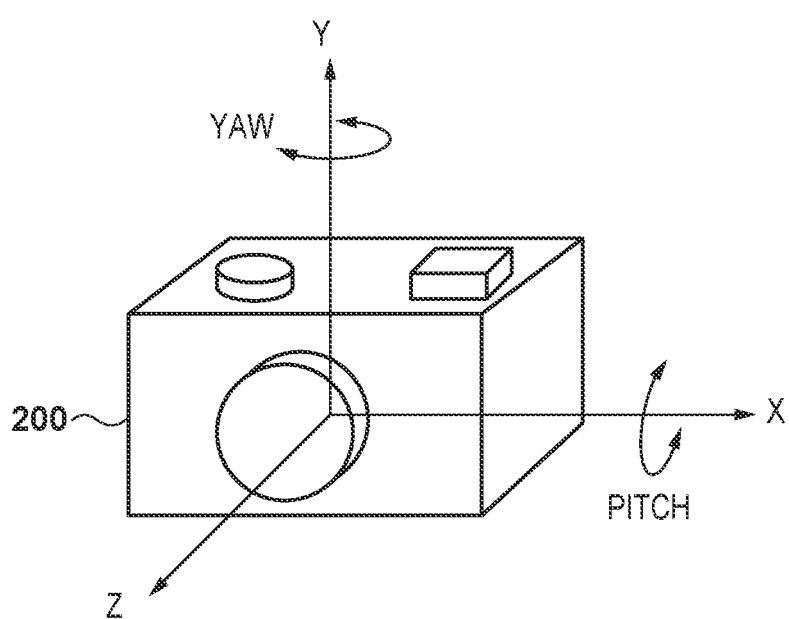
FIG. 2 is a diagram for describing a rotation axis of the digital camera according to the first embodiment.

In step S301, the camera shake detection sensor 241 detects an amount of camera shake applied to the digital camera 200, which is represented by an angular velocity, for example. The camera shake detection sensor 241 can detect vibration in a pitch direction (rotation about a pitch axis) and in a yaw direction (rotation about a yaw axis) in the digital camera 200, in an orthogonal coordinate system as shown in FIG. 2, for example.

In step S302, the camera shake correction control circuit 232 calculates a camera shake correction amount. Specifically, first, a camera shake signal generated by the camera shake detection sensor 241 is input to the camera shake correction control circuit 232. An amplifier 2321 acquires the camera shake signal from the camera shake detection sensor 241, and amplifies the acquired camera shake signal by a predetermined magnification. An A/D converter 2322 converts the camera shake signal that has been amplified by the amplifier 2321 from an analog signal to a digital signal. A filter 2323 performs filter processing on the camera shake signal that has been converted to a digital signal by the A/D converter 2322 such that a portion of the signal is cut off at a predetermined cut-off frequency that has been set. For example, a low pass filter is used to remove high frequency noise, or a high pass filter is used to remove an offset component. Then, the camera shake correction control circuit 232 integrates the camera shake signal output from the filter in order to calculate the camera shake correction amount to be applied to the digital camera 200.

Next, a camera shake correction amount computation circuit 2324 further magnifies, for adjustment, the camera shake correction amount calculated in the filter 2323 based on positions of the optical members such as the zoom lens and a focus lens, and a focal distance and a magnification obtained from these positions. The reason for this processing being performed is to deal with the change in sensitivity of camera shake correction on the imaging plane relative to a stroke of the camera shake correction due to the change in optical parameters such as a focal distance and a magnification.

Figure 5A:
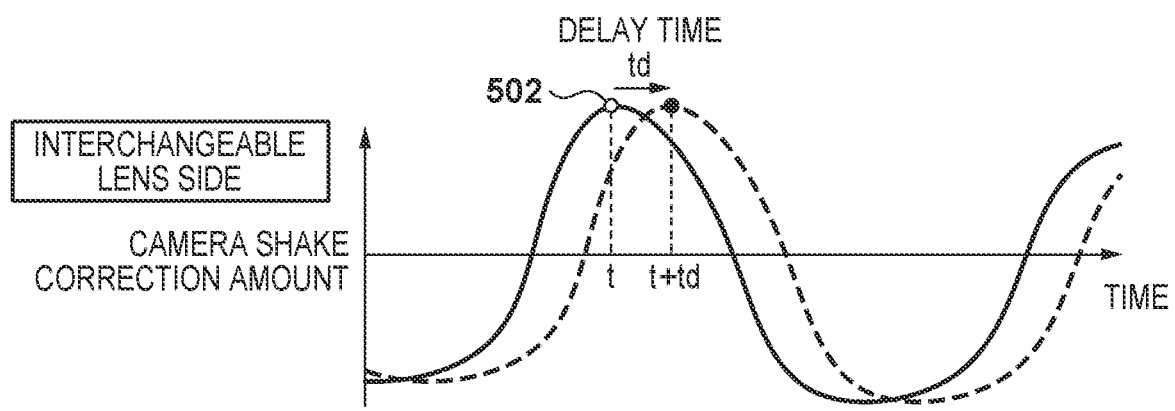
FIGS. 5A and 5B are diagrams illustrating time series waveforms of a camera shake correction amount according to the first embodiment.
Figure 5B:
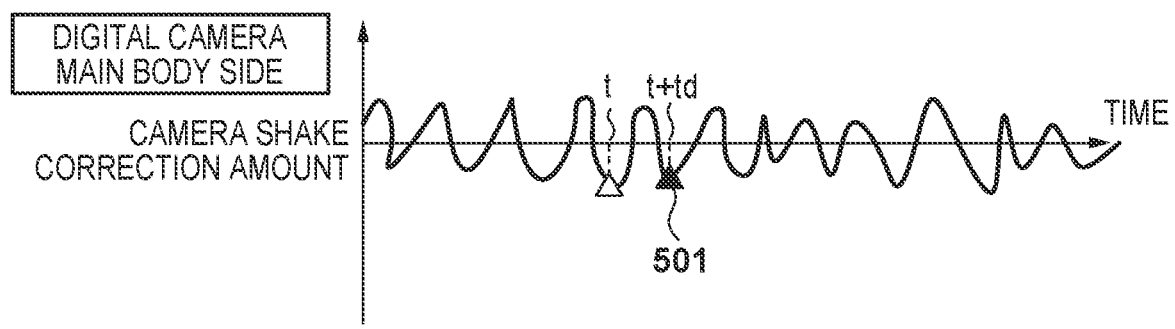

In step S303, the camera shake correction control circuit 232 performs processing for dividing the camera shake correction amount obtained in step S302 into a component that is to be corrected by driving the image sensor 251 and a component that is to be corrected by driving the camera shake correction lens 112. As a method of dividing the camera shake correction amount into a component that is to be corrected by driving the image sensor 251 and a component that is to be corrected by driving the camera shake correction lens 112, the camera shake correction amount is divided at a predetermined frequency, as shown in FIGS. 5A and 5B, for example. In FIGS. 5A and 5B, the horizontal axis shows the time, and the vertical axis shows the camera shake correction amount. The high frequency component, of the camera shake correction amount, of camera shake that is equal to or higher than a predetermined frequency is corrected by controlling the position of the image sensor 251. Meanwhile, the low frequency component of camera shake that is lower than the predetermined frequency is corrected by controlling the position of the camera shake correction lens 112. As a result of adopting a configuration in which the low frequency component is transmitted to the interchangeable lens 100, the error in the camera shake correction amount due to communication delay can be reduced. However, there are cases where, if the low frequency component of the correction amount is large, or a later-described delay time is larger than a predetermined time, the intended effects cannot be obtained. Therefore, the division method may be changed according to the signal from the camera shake detection sensor and the state of an image capturing apparatus system.

Figure 7A:
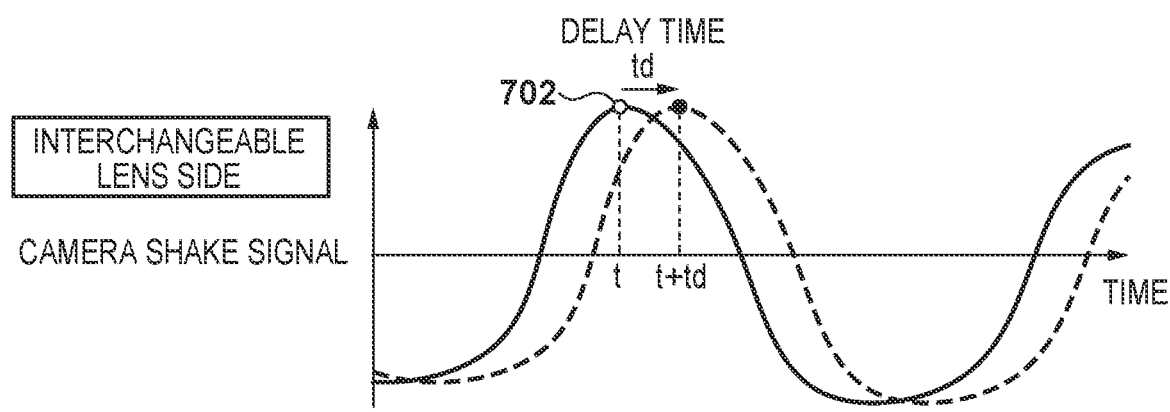
FIGS. 7A and 7B are diagrams illustrating other time series waveforms of the camera shake correction amount according to the first embodiment.
Figure 7B:
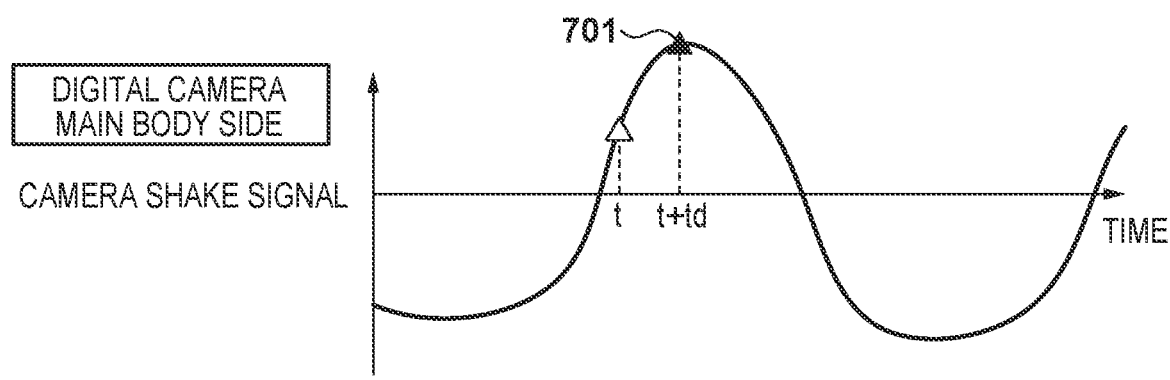

As an example of another division method, a case where the camera shake correction amount is divided at a predetermined ratio is shown in FIGS. 7A and 7B. In FIGS. 7A and 7B, the horizontal axis shows the time, and the vertical axis shows the camera shake correction amount, similarly to FIGS. 5A and 5B. The calculated total camera shake correction amount is divided at a predetermined ratio so as to obtain a correction amount to be allocated to the image sensor 251 and a correction amount to be allocated to the camera shake correction lens 112. As a result of sharing the camera shake correction amount between a plurality of camera shake correction driving apparatuses (image sensor 251 and camera shake correction lens 112), a larger camera shake can be corrected.

In step S304, the camera shake correction control circuit 232 transmits the component, of the camera shake correction amount, that is to be corrected by the camera shake correction lens 112 and has been obtained by dividing the camera shake correction amount in step S303 to the interchangeable lens 100. Specifically, the camera shake correction control circuit 232 transmits the camera shake correction amount to the lens controller 121 from the system controller 221 via the lens mount 151 that includes communication means and the main body mount 201.

In step S305, the camera shake correction control circuit 232 detects the current position of the image sensor 251. An image sensor position detection sensor 2326 that includes a sensor for detecting the position of the image sensor, which is a movable unit, outputs a position signal that indicates the position of the image sensor from the sensor. An amplifier 2327 amplifies the detected position signal by a predetermined magnification, and an A/D converter 2328 converts an analog signal to a digital signal, and inputs the digital signal to the camera shake correction amount computation circuit 2324.

In step S306, the camera shake correction control circuit 232 calculates the target position of the image sensor 251. Specifically, the camera shake correction amount computation circuit 2324 calculates the target position of the image sensor 251 based on the camera shake correction amount for the image sensor 251, which is obtained in step S303, and the position of the image sensor 251, which is obtained in step S306. Then, the position control signal indicating the target position is generated.

In step S307, the camera shake correction control circuit 232 controls the position of the image sensor 251. Specifically, a driver 2325 causes a drive current to flow to a camera shake correction actuator for driving the image sensor 251, according to the position control signal generated in step S306. The camera shake correction actuator, driven by the received current, drives the image sensor 251, which is a movable unit. The camera shake correction control circuit 232 regularly repeats processing relating to the camera shake correction control, and then ends the processing.

Figure 4:
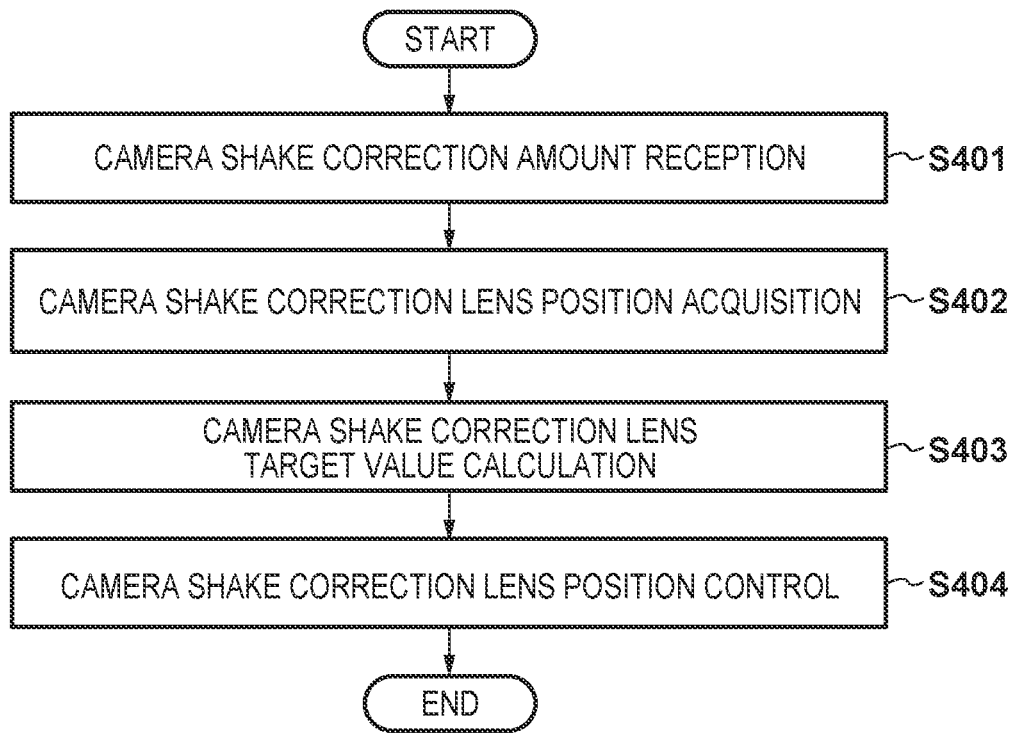
FIG. 4 is a flowchart illustrating series of operations of camera shake correction processing in an interchangeable lens according to the first embodiment.

Next, the camera shake correction processing in the interchangeable lens 100 will be described. FIG. 4 shows series of operations relating to the camera shake correction processing to be executed in the interchangeable lens 100. Note that the camera shake correction processing shown in FIG. 4 is realized by the lens controller 121 of the interchangeable lens 100 deploying a program stored in the internal ROM to the RAM, executing the deployed program, and controlling the units of the interchangeable lens 100.

In step S401, the lens controller 121 receives the camera shake correction amount for the camera shake correction lens 112 via the lens mount 151. The lens controller 121 inputs the received camera shake correction amount to the camera shake correction control circuit 132.

In step S402, the camera shake correction control circuit 132 performs processing for detecting the position of the camera shake correction lens. A camera shake correction lens position detection sensor 1323 is for detecting the position of the camera shake correction lens 112, which is to be driven. The position signal generated here is amplified by the amplifier 1324 by a predetermined magnification and is input to a camera shake correction amount computation circuit 1321 via an A/D converter 1325.

In step S403, the camera shake correction control circuit 132 calculates a camera shake correction lens target value. The camera shake correction amount computation circuit 1321 computes a position control signal based on the camera shake correction amount for camera shake correction lens 112 that has been received in step S401 and the position signal acquired in step S402, similarly to the case where the image sensor 251 is driven.

In step S404, a driver 1322 causes a current for driving the camera shake correction lens 112 to flow according to the position control signal computed in step S403. Upon receiving this current, a camera shake correction actuator drives the camera shake correction lens 112. The interchangeable lens 100 performs the camera shake correction processing using the camera shake correction lens 112 by regularly executing the above-described processing. Thereafter, the lens controller 121 ends this processing.

As a result of adopting a configuration in which the camera shake correction amount is shared by the plurality of camera shake correction driving apparatuses (image sensor 251 and camera shake correction lens 112), a large camera shake can be corrected and a long time shooting can be realized, compared with a case where the camera shake is corrected by a single driving apparatus.

Correction Regarding Lens Characteristics

Figure 6A:
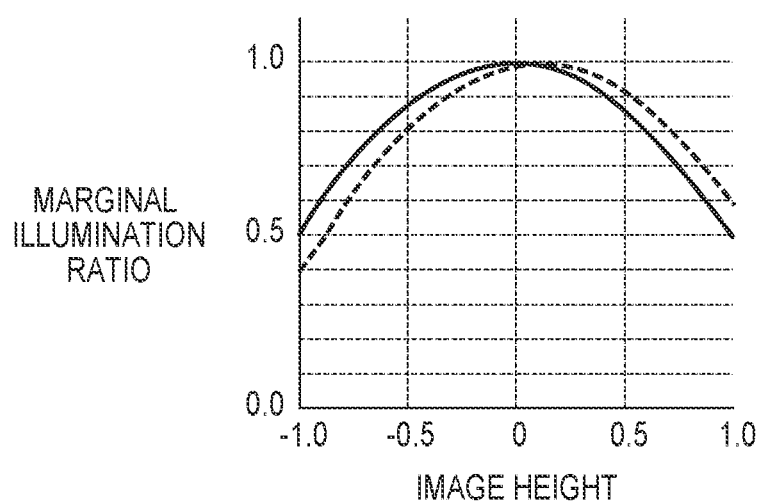
FIGS. 6A to 6C are diagrams for describing correction regarding marginal illumination characteristics according to the first embodiment.

Next, correction regarding lens characteristics in the present embodiment will be described with reference to FIGS. 6A to 6C. Note that, in the present embodiment, marginal illumination will be described as an example of the lens characteristics regarding which correction is performed. The solid line shown in FIG. 6A shows marginal illumination characteristics when the camera shake correction lens 112 and the image sensor 251 are fixed at the respective central positions. In FIG. 6A, the horizontal axis shows the image height and the vertical axis shows the marginal illumination ratio. In general, the characteristics show that, when the marginal illumination ratio at the optical center is defined as 1.0, the light amount decreases as it separates from the optical center, as shown in FIG. 6A.

Figure 6B:
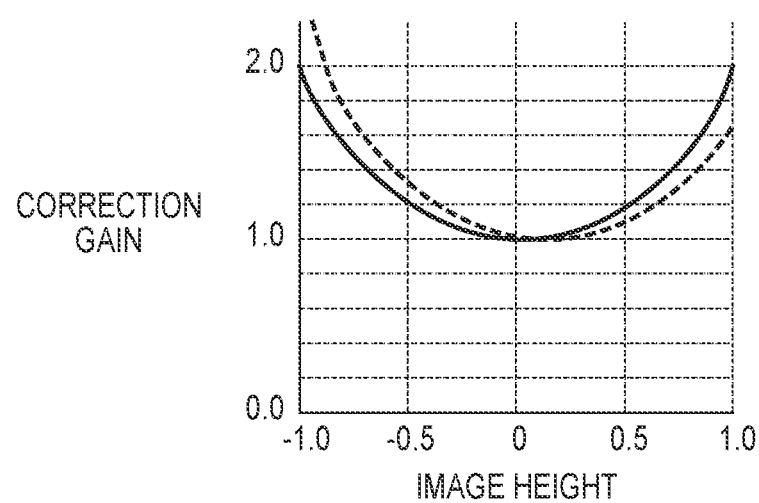

The solid line in FIG. 6B shows a graph of gain characteristics for marginal illumination correction. Note that FIG. 6B corresponds to the marginal illumination characteristics in FIG. 6A. In the marginal illumination correction, the image processing circuit 261 performs processing in which an input image signal is amplified according to the image height and the correction gain.

The gain for performing the marginal illumination correction is stored in a RAM of the lens controller 121, for example, in the interchangeable lens 100, as table data showing gains for respective states of the optical system including the zoom lens, the focus lens, the aperture, and the like. The digital camera 200, when powered on, receives the gain table data from the lens controller 121, and temporarily stores the data in the internal memory 273. The image processing circuit 261 changes the parameters to be used in the marginal illumination correction according to the stored gain table data, the sensor size of the image sensor 251, design values of the mount and the like, and the state of the optical system. Note that a case has been described where the gain for marginal illumination correction is stored in the interchangeable lens 100 before power-on, but the gain may already be stored in the digital camera 200 prior to power-on.

Figure 6C:
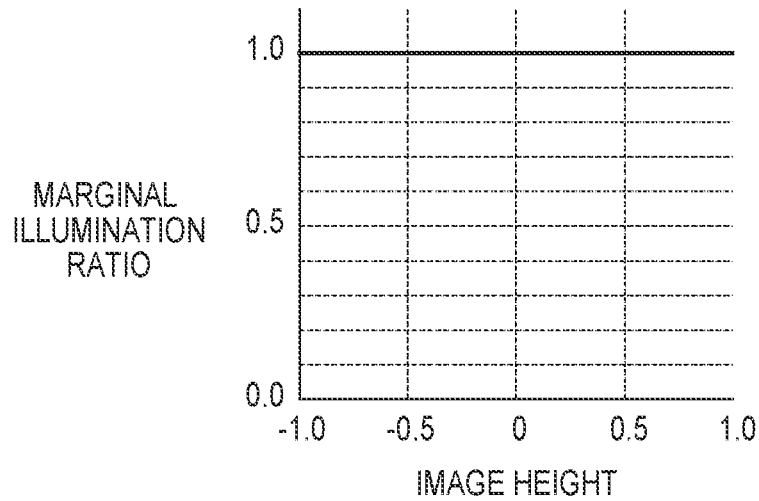

The solid line shown in FIG. 6C shows marginal illumination characteristics after marginal illumination correction has been performed. It is desirable that the characteristics shown in FIG. 6C show characteristics in which the marginal illumination ratio is constant (1.0, for example) regardless of the image height.

Correction Regarding Lens Characteristics According to Position of Camera Shake Correction Movable Unit The camera shake correction processing is processing in which the camera shake correction control circuit 232 changes the position of the camera shake correction lens 112 according to the camera shake amount, for example. Therefore, if the camera shake correction is enabled, correction regarding the lens characteristics need to be performed according to the position of the camera shake correction lens 112.

For example, marginal illumination characteristics when relative positions of the interchangeable lens 100 and the digital camera 200 are changed as a result of the camera shake correction being performed are shown by the broken line in FIG. 6A. When marginal illumination characteristics change due to the change in the relative positions of the interchangeable lens 100 and the digital camera 200, as shown by the broken line in FIG. 6A, gains for marginal illumination correction corresponding to the broken line shown in FIG. 6A need to be applied, as shown by the broken line in FIG. 6B. That is, a reference point (position at image height 0) moves according to the shake correction amount, and a larger correction value is applied as the distance from the reference point increases. When the input signal is corrected using the gain shown in FIG. 6B, a correction result in which the marginal illumination ratio is constant (1.0, for example) regardless of the image height, as shown by the solid line shown in FIG. 6C, can be obtained.

However, if the position of the camera shake correction lens 112 to be used in marginal illumination correction is different from the actual position of the camera shake correction lens 112 due to the communication delay, the correction gain characteristics to be applied shifts from the correction gain characteristics that should be applied. Therefore, excessive correction is performed in some portions, and correction is insufficient in other portions. As a result, a correction result in which the marginal illumination ratio is constant, as shown in FIG. 6C, cannot be obtained. That is, if the camera shake correction amount is acquired as needed by performing communication between the digital camera 200 and the interchangeable lens 100, excessive correction and insufficient correction are incurred in the correction regarding lens characteristics. That is, when the setting is configured such that the camera shake correction is enabled, the position of the camera shake correction lens 112 at the timing at which marginal illumination is corrected needs to be acquired in order to appropriately correct the marginal illumination.

In this regard, in the present embodiment, the image processing circuit 261 performs correction regarding lens characteristics with consideration to the camera shake correction amount, which is used by the camera shake correction control circuit 132, that was obtained at a time prior to the current time by a predetermined time corresponding to the communication delay. As a result of adopting this configuration, the influence of delay in communication with the image processing circuit 261 that performs correction regarding lens characteristics can be suppressed. That is, if the interchangeable lens 100 is provided with a camera shake detection sensor, and the detection result is used for the correction regarding lens characteristics on the digital camera 200 side, a delay occurs in communication between the interchangeable lens 100 and the digital camera 200, which directly incurs delay in correction regarding lens characteristics. On the other hand, even if camera shake is detected using the camera shake detection sensor 241 of the digital camera 200, a delay occurs when the camera shake correction value is transmitted to the interchangeable lens 100. Therefore, the timing of camera shake correction performed by the camera shake correction lens 112 is delayed. Therefore, in the present embodiment, the camera shake correction amounts controlled by the respective camera shake correction control circuits are defined as follows, and correction regarding lens characteristics is performed based on these camera shake correction amounts.

The camera shake correction amount of the image sensor 251 at time t is denoted as TargetIIS(t), and the camera shake correction amount of the camera shake correction lens 112 at time t is denoted as TargetOIS(t). Here, the delay time in communication between the interchangeable lens 100 and the digital camera 200 can be acquired by a communication delay acquisition unit 222. The communication delay acquisition unit 222 can acquire the delay time at the initial communication with the interchangeable lens 100 when the digital camera is started up, or may use the delay time that has been measured in advance, and stored in a ROM, which is not illustrated, in the interchangeable lens 100 or in the internal memory 273 in the digital camera 200.

Here, if the delay time acquired by the communication delay acquisition unit 222 is denoted by td, the camera shake correction amounts for the respective driving apparatuses at time t+td are as follows, with reference to FIGS. 5A and 5B.

Camera shake correction amount for image sensor (501)=TargetIIS($t+td$)

Camera shake correction amount for camera shake correction lens(502)=TargetOIS($t$)

That is, the camera shake correction control circuit 232 that drives the image sensor 251 uses the latest camera shake correction amount that has been obtained while acquiring an image signal, which is obtained by exposure and is to be corrected. In contrast, the camera shake correction control circuit 132 that drives the camera shake correction lens 112 uses the camera shake correction amount, in the result obtained by the camera shake detection sensor 241, that was obtained at a time prior to the current time by the delay time td. Also, the positions of the image sensor and the camera shake correction lens are obtained based on these camera shake correction amounts, and correction regarding lens characteristics is performed based on these positions. In this way, the influence of the delay in communication between the digital camera 200 and the interchangeable lens 100 on the correction regarding lens characteristics can be reduced.

Note that, as described above, FIGS. 7A and 7B show another example of the case where the camera shake correction amount is shared by two driving apparatuses. In FIGS. 7A and 7B, similarly to FIGS. 5A and 5B, the camera shake correction amounts of the respective driving apparatuses at time t+td are as follows.

Camera shake correction amount for image sensor (701)=TargetIIS($t+td$)

Camera shake correction amount for camera shake correction lens(702)=TargetOIS($t$)

That is, even if the method of dividing the camera shake correction amount is changed, as a result of adjusting, considering the delay, the camera shake correction amount to be used in the camera shake correction control circuit 232 that drives the image sensor 251, the influence of the delay in communication on the correction regarding lens characteristics can be reduced. In this way, the above-described embodiment can be applied regardless of the method of dividing the camera shake correction amount.

As described above, in the present embodiment, the camera shake correction amount by which the position of the camera shake correction lens of the interchangeable lens 100 is to be corrected is sequentially calculated based on a signal from the camera shake detection sensor 241 of the digital camera 200, and the camera shake correction amount is transmitted to the interchangeable lens 100. Furthermore, when correction regarding the lens characteristics with respect to the captured image signal is performed, correction is performed using the camera shake correction amount, of the sequentially calculated camera shake correction amounts, at a time prior to the current time by a predetermined time. Accordingly, the degradation in the quality of correction regarding lens characteristics due to the delay in communication between the interchangeable lens 100 and the digital camera 200 can be suppressed. That is, when correction regarding lens characteristics is performed in the camera main body, while using at least the camera shake correction apparatus on the interchangeable lens side, the influence of delay in communication between the interchangeable lens and the camera main body can be reduced.

Second Embodiment

Next, a second embodiment will be described. In the first embodiment, a case where correction regarding marginal illumination of the lens characteristics is performed has been described as an example. In the present embodiment, a case where distorted aberration of the lens characteristics is corrected (simply referred also as "distortion correction")

will be described as an example. The shooting optical system included in the interchangeable lens 100 has optical aberration, and distortion occurs in a peripheral portion of an image formed on the image sensor 251 due to this optical aberration. Note that the interchangeable lens 100 and the digital camera 200 according to the present embodiment are configured substantially similarly to those in the first embodiment. As such, the same constituent elements will be assigned the same reference signs, and redundant descriptions will be omitted, with the descriptions focusing on the differences.

Correction Processing Regarding Lens Characteristics

Figure 8A:
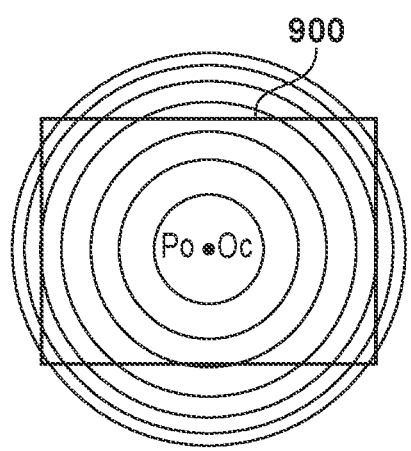
FIGS. 8A to 8C are diagrams for describing distortion correction according to a second embodiment.

Because the correction parameter for distorted aberration can be represented as a concentric parameter with a correction center Oc as a reference, correction can be performed on each pixel according to the distance from the correction center Oc. For example, FIG. 8A schematically shows an example of distortion correction in the case where the camera shake correction lens 112 is fixed at a central position (position of optical axis). Circles with the correction center Oc as the center each indicate positions at which the same correction value is applied, and a larger correction value is applied as separating from the correction center Oc. In the example shown in FIG. 8A, distortion correction is performed on an image 900 with the optical axis center Po as a center. For example, the image processing circuit 261 reads out a predetermined correction value according to the distance from the correction center Oc from the internal memory 273, and performs correction processing on the peripheral portion of the image, and as a result, distortion can be prevented from occurring in the periphery of the image.

Figure 8B:
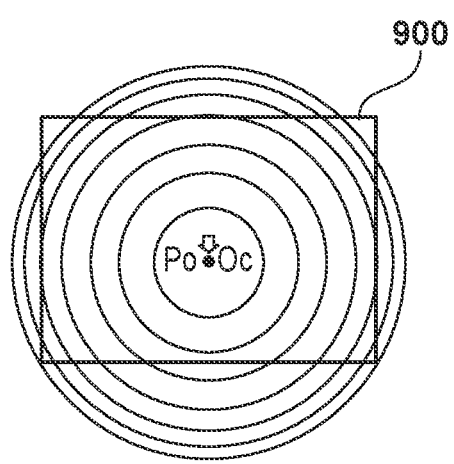

On the other hand, FIG. 8B schematically shows an example of distortion correction in the case where the optical axis of the camera shake correction lens 112 has been shifted downward by camera shake correction. When the camera shake correction lens 112 moves, optical aberration also changes, and as a result, distortion correction needs to be performed according to the position of the camera shake correction lens 112. That is, the correction center Oc in distortion correction needs to be changed according to the position of the camera shake correction lens 112.

In order to realize the correction shown in FIG. 8B, the image processing circuit 261 applies correction values such that the correction amount for a pixel on an upper side of the shooting region increases and the correction amount for a pixel on a lower side of the shooting region decreases (larger correction value is applied as separating from the correction center Oc). With this processing, the image on the upper side of the shooting region extends more, and the image on the lower side of the shooting region extends less.

Figure 8C:
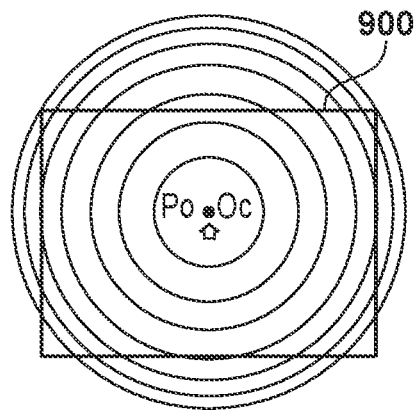

FIG. 8C shows an example of distortion correction in the case where the optical axis of the camera shake correction lens 112 has been shifted upward by camera shake correction. As described above, because the correction center Oc in distortion correction changes according to the position of the camera shake correction lens 112, the image processing circuit 261 applies correction values such that the correction amount for a pixel on an upper side of the shooting region decreases and the correction amount for a pixel on a lower side of the shooting region increases. With this processing, the image on the upper side of the shooting region extends less, and the image on the lower side of the shooting region extends more.

As a result of determining the distortion correction parameter according to the position of the camera shake correction lens 112, in this way, the expansion/contraction of an image due to optical aberration can be corrected. Note that a case has been described where camera shake correction is performed by driving the camera shake correction lens 112 in the example described above, but the method can also be applied to a case where the position of the image sensor 251 is changed.

Correction Processing Regarding Lens Characteristics According to Position of Camera Shake Correction Movable Unit Correction regarding lens characteristics in the second embodiment is distortion correction based on positions of the camera shake correction lens 112 and the image sensor 251. Note that the camera shake correction amounts for obtaining the positions of the camera shake correction lens 112 and the image sensor 251 are defined as follows.

The camera shake correction amount of the image sensor 251 at time t is denoted as TargetIIS(t), and the camera shake correction amount of the camera shake correction lens 112 at time t is denoted as TargetOIS(t). If the time acquired by the communication delay acquisition unit 222 is denoted as td, the camera shake correction amounts of the respective driving apparatuses at time t+td are as follows.

Camera shake correction amount for image sensor
(501,701)=TargetIIS($t+td$)

Camera shake correction amount for camera shake
correction lens(502,702)=TargetOIS($t$)

In this way, even in a case where distortion correction is performed, the value of the camera shake correction amount at a time prior to the current time by a delay time td is used on the camera shake correction lens 112 side, similarly to the first embodiment. Also, the positions of the image sensor and the camera shake correction lens are obtained based on these camera shake correction amounts, and the distortion correction parameter is obtained based on the positions. As a result, even in a case where a plurality of camera shake correction driving apparatuses including the one that drives the interchangeable lens 100 are included, the influence of delay time on the correction regarding lens characteristics can be reduced. Also, in the present embodiment as well, another method of dividing the camera shake correction amount can be used. Furthermore, even in a case where the camera shake correction apparatus is not included in the digital camera, or in a case where the camera shake correction apparatus on the interchangeable lens side is used without driving the camera shake correction apparatus on the digital camera side, the influence of delay in communication between the interchangeable lens and the camera main body can be reduced, when correction regarding lens characteristics is performed in the camera main body.

Other Embodiments

In the embodiments described above, descriptions have been given in which marginal illumination and distorted aberration are taken as an example of the lens characteristics, but the above-described embodiments can also be similarly applied to correct magnification chromatic aberration, coma aberration, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-027246, filed Feb. 19, 2018, which is hereby incorporated by reference herein in its entirety.

What is claimed is:

1. An image capturing apparatus, comprising:
a shake detection sensor which detects shaking;
a calculation circuit which calculates a first shake correction amount based on a shake signal output from the shake detection sensor;
a transmitting circuit which transmits the first shake correction amount to a lens apparatus that comprises first image stabilization apparatus for correcting shaking by moving an optical system; and
a lens characteristics correction circuit which performs correction regarding lens characteristics in an image signal obtained by image-capturing in a state in which the first image stabilization apparatus has corrected shaking, based on the first shake correction amount,
wherein the lens characteristics correction circuit performs the correction regarding lens characteristics based on the first shake correction amount at a time prior to the image-capturing time by a predetermined time.

2. The image capturing apparatus according to claim 1, further comprising a second image stabilization apparatus which corrects shaking by moving an image sensor by a second shake correction amount that the calculation circuit has calculated based on a shake signal from the shake detection sensor,
wherein the lens characteristics correction circuit performs correction regarding lens characteristics in an image signal obtained by image-capturing in a state in which the first image stabilization apparatus and the second image stabilization apparatus have corrected shaking, based on the second shake correction amount and the first shake correction amount that was calculated at a time prior to the time at which the second shake correction amount is calculated by the predetermined time.

3. The image capturing apparatus according to claim 2, wherein the predetermined time is a delay time in communication when the first shake correction amount is transmitted to the lens apparatus.

4. The image capturing apparatus according to claim 2,
wherein the calculation circuit calculates the first shake correction amount by separating a shake correction amount based on a shake signal output from the shake detection sensor using a predetermined separation method, and
wherein the second image stabilization apparatus uses the second shake correction amount obtained by separating the shake correction amount based on the shake signal output from the shake detection sensor using the predetermined separation method.

5. The image capturing apparatus according to claim 4, wherein the calculation circuit changes the predetermined separation method based on at least one of the magnitude of a first shake correction amount and a delay time.

6. The image capturing apparatus according to claim 2,
wherein the calculation circuit calculates a low frequency component, of a shake correction amount based on a shake signal output from the shake detection sensor, that is lower than a predetermined frequency as the first shake correction amount,
the second image stabilization apparatus uses a high frequency component, of the shake correction amount based on the shake signal output from the shake detection sensor, that is equal to or higher than the predetermined frequency as the second shake correction amount, and
the lens characteristics correction circuit performs correction regarding lens characteristics in the image signal obtained by image-capturing based on the second shake correction amount and the first shake correction amount that was calculated at a time prior to the time at which the second shake correction amount is calculated by the predetermined time.

7. The image capturing apparatus according to claim 2, wherein the lens characteristics correction circuit applies a correction value that increases as the distance of movement, from a reference point, according to a sum of the first shake correction amount and the second shake correction amount increases.

8. The image capturing apparatus according to claim 1, wherein the lens characteristics correction circuit performs correction regarding lens characteristics in the image signal based on the first shake correction amount that has been calculated by the calculation circuit based on the shake signal that was output from the shake detection sensor at a time prior to, by the predetermined time, the time at which a shake signal is output from the shake detection sensor when the image signal is being obtained by exposure.

9. The image capturing apparatus according to claim 8, wherein the predetermined time is a delay time in communication when the first shake correction amount is transmitted to the lens apparatus.

10. The image capturing apparatus according to claim 1, wherein the calculation circuit calculates a low frequency component, of a shake correction amount based on a shake signal output from the shake detection sensor, that is lower than a predetermined frequency as the first shake correction amount.

11. The image capturing apparatus according to claim 1, wherein the calculation circuit calculates a signal obtained by separating a shake correction amount based on a shake signal output from the shake detection sensor at a predetermined ratio as the first shake correction amount.

12. The image capturing apparatus according to claim 1, wherein the lens characteristics correction circuit applies a correction value that increases as the distance of movement, from a reference point, according to a shake correction amount increases.

13. The image capturing apparatus according to claim 1,
   wherein the lens apparatus includes at least one of optical members of a zoom lens, a focus lens, and an aperture, and
   wherein the lens characteristics correction circuit adjusts, based on a state of the at least one of optical members, the shake correction amount based on a shake signal output from the shake detection sensor.

14. The image capturing apparatus according to claim 1, wherein the lens characteristics in an image signal obtained by image-capturing includes at least any of marginal illumination, distorted aberration, magnification chromatic aberration, and coma aberration.

15. A control method of an image capturing apparatus comprising:
   detecting shaking using a shake detection sensor;
   calculating a first shake correction amount based on a shake signal output from the shake detection sensor;
   transmitting the first shake correction amount to a lens apparatus that comprises a first image stabilization apparatus that corrects shaking by moving an optical system; and
   performing correction regarding lens characteristics in an image signal obtained by image-capturing in a state in which the first image stabilization apparatus has corrected shaking based on the first shake correction amount, based on the first shake correction amount at a time prior to the image-capturing time by a predetermined time.

16. A non-transitory computer-readable storage medium storing a program for causing a computer to execute a control method of an image capturing apparatus, the method comprising:
   detecting shaking using a shake detection sensor;
   calculating a first shake correction amount based on a shake signal output from the shake detection sensor;
   transmitting the first shake correction amount to a lens apparatus that comprises a first image stabilization apparatus that corrects shaking by moving an optical system; and
   performing correction regarding lens characteristics in an image signal obtained by image-capturing in a state in which the first image stabilization apparatus has corrected shaking based on the first shake correction amount, based on the first shake correction amount at a time prior to the image-capturing time by a predetermined time.

* * * * *